(12) United States Patent
Salsbury et al.

(10) Patent No.: US 10,364,997 B2
(45) Date of Patent: Jul. 30, 2019

(54) CONTROL SYSTEM WITH MAXIMUM TIME CONSTANT ESTIMATION

(71) Applicant: Johnson Controls Technology Company, Plymouth, MI (US)

(72) Inventors: Timothy I. Salsbury, Mequon, WI (US); John M. House, Saint-Leonard (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 127 days.

(21) Appl. No.: 15/448,179

(22) Filed: Mar. 2, 2017

(65) Prior Publication Data

US 2018/0252422 A1 Sep. 6, 2018

(51) Int. Cl.
*F24F 3/00* (2006.01)
*F24F 7/08* (2006.01)
(Continued)

(52) U.S. Cl.
CPC ............. *F24F 11/30* (2018.01); *F24F 11/56* (2018.01); *F24F 11/61* (2018.01); *F24F 11/62* (2018.01); *G05B 19/0426* (2013.01); *F24F 3/00* (2013.01); *F24F 7/08* (2013.01); *F24F 11/58* (2018.01); *F24F 11/65* (2018.01); *G05B 2219/2614* (2013.01)

(58) Field of Classification Search
CPC .. F24F 11/30; F24F 11/62; F24F 11/56; F24F 11/61; F24F 11/65; F24F 11/58; F24F 3/00; F24F 7/08; G05B 19/0426; G05B 2219/2614
See application file for complete search history.

(56) References Cited

U.S. PATENT DOCUMENTS 5,282,130 A * 1/1994 Molnar ............. G05B 13/0205
700/37
5,355,305 A 10/1994 Seem et al.
(Continued)

OTHER PUBLICATIONS

U.S. Appl. No. 14/495,773, filed Sep. 24, 2014, Johnson Controls Technology Company.
(Continued)

*Primary Examiner* — Thomas C Lee
*Assistant Examiner* — Anzuman Sharmin
(74) *Attorney, Agent, or Firm* — Foley & Lardner LLP

(57) ABSTRACT

A controller includes a communications interface configured to provide a control input to and receive feedback from a plant. The feedback is representative of a response of the plant to the control input over a response period. The controller further includes a time constant estimator. The time constant estimator calculates a normalized variable based on the feedback, each value of the normalized variable representative of the response of the plant at a different time during the response period. The time constant estimator calculates a plurality of time constant estimates, based on the plurality of values of the normalized variable. The time constant estimator determines a maximum time constant from the time constant estimates. The controller further includes a control input generator that generates the control input for the plant using the maximum time constant. The control input affects a variable state or condition of the plant.

20 Claims, 7 Drawing Sheets

(51) Int. Cl.
*F24F 11/30* (2018.01)
*F24F 11/56* (2018.01)
*F24F 11/58* (2018.01)
*F24F 11/61* (2018.01)
*F24F 11/62* (2018.01)
*F24F 11/65* (2018.01)
*G05B 19/042* (2006.01)

(56) References Cited

U.S. PATENT DOCUMENTS

| | | |
|---|---|---|
| 5,506,768 A | 4/1996 | Seem et al. |
| 6,937,909 B2 | 8/2005 | Seem |
| 7,827,813 B2 | 11/2010 | Seem |
| 8,027,742 B2 | 9/2011 | Seem et al. |
| 8,200,344 B2 | 6/2012 | Li et al. |
| 8,200,345 B2 | 6/2012 | Li et al. |
| 8,473,080 B2 | 6/2013 | Seem et al. |
| 9,395,708 B2 | 7/2016 | Perez et al. |
| 2014/0257528 A1* | 9/2014 | Perez ............... G05B 13/047 700/46 |
| 2016/0098020 A1 | 4/2016 | Salsbury et al. |
| 2016/0132027 A1* | 5/2016 | Li ..................... G05B 13/024 700/33 |
| 2016/0282820 A1 | 9/2016 | Perez et al. |
| 2016/0282822 A1 | 9/2016 | Perez et al. |

OTHER PUBLICATIONS

U.S. Appl. No. 14/975,527, filed Dec. 18, 2015, Johnson Controls Technology Company.
U.S. Appl. No. 15/080,435, filed Mar. 24, 2016, Johnson Controls Technology Company.
U.S. Appl. No. 15/284,468, filed Oct. 3, 2016, Johnson Controls Technology Company.

* cited by examiner

CONTROL SYSTEM WITH MAXIMUM TIME CONSTANT ESTIMATION

BACKGROUND

The present disclosure relates generally to control systems for a plant. More particularly, the present disclosure relates to a control system configured to estimate or determine a maximum time constant of a plant for use in configuring the control system.

A plant in control theory is the combination of a process and one or more mechanically-controlled outputs. For example, a plant can be an air handling unit (AHU) configured to control temperature within a building space via one or more mechanically-controlled actuators and/or dampers. Other examples of plants include a chiller operation process, a damper adjustment process, a mechanical cooling process, a ventilation process, a refrigeration process, or any other process in which an input variable to a plant is adjusted to affect an output from the plant.

Many control algorithms for a plant require knowledge about the time scale of the plant being controlled (e.g., the amount of time taken by the plant to execute a process or command). Time scale information is often represented in the form of a single value known as a time constant. However, the use of a single time constant assumes that the plant being controlled can be approximated as a first-order system. If the plant is not behaving as a first-order system, the use of a single time constant estimate may be an issue. Particularly, the time constant may be too small, leading to a sampling interval of the algorithm to be too short. Several techniques have been used to estimate a time constant from data from a plant. Such techniques typically do not work when the responses from the plant are higher order and/or non-linear.

Many algorithms, such as extremum-seeking control (ESC) and proportional-integral (PI) control require an estimate of the plant time constant that relates to the slowest part of a response in a non-linear or higher order system. Standard methods of estimating a time constant do not yield a good estimate in a non-linear or higher order system. There is a need for a method that determines a worst-case or longest time constant estimate from a plant in a non-linear or higher order system.

SUMMARY

One implementation of the present disclosure relates to a controller for a plant. The controller includes a communications interface configured to provide a control input to the plant and to receive feedback from the plant. The feedback is representative of a response of the plant to the control input over a response period. The controller further includes a time constant estimator. The time constant estimator is configured to calculate a plurality of values of a normalized variable based on the feedback. Each value of the normalized variable is representative of the response of the plant at a different time during the response period. The time constant estimator is further configured to calculate a plurality of time constant estimates. Each of the time constant estimates is calculated based on one of the plurality of values of the normalized variable and represents the response of the plant to the control input at one of the different times during the response period. The time constant estimator is further configured to determine a maximum time constant for the response of the plant over the response period based on the plurality of time constant estimates. The controller further includes a control input generator configured to use the maximum time constant to generate the control input for the plant. The plant uses the control input to affect a variable state or condition of the plant.

Another implementation of the present disclosure relates to a method for calculating and using a time constant to control a plant. The method includes providing, at a controller, a control input to a plant. The method further includes receiving, at the controller, feedback from the plant, the feedback representative of a response of the plant to the control input over a response period. The method further includes calculating, at the controller, a plurality of values of a normalized variable based on the feedback, each value of the normalized variable representative of the response of the plant at a different time during the response period. The method further includes calculating, at the controller, a plurality of time constant estimates, wherein each of the time constant estimates is calculated based on one of the plurality of values of the normalized variable, and represents the response of the plant to the control input at one of the different times during the response period. The method further includes determining, at the controller, a maximum time constant for the response of the plant over the response period based on the plurality of time constant estimates. The method further includes using the maximum time constant to generate the control input for the plant, wherein the plant uses the control input to affect a variable state or condition of the plant.

Another implementation of the present disclosure relates to an extremum-seeking controller. The extremum-seeking controller includes a communications interface configured to provide a control input to a plant and receive feedback from the plant. The feedback is representative of a response of the plant to the control input over a response period. The extremum-seeking controller further includes a time constant estimator. The time constant estimator is configured to calculate a plurality of values of a normalized variable based on the feedback. Each value of the normalized variable is representative of the response of the plant at a different time during the response period. The time constant estimator is further configured to calculate a plurality of time constant estimates. Each of the time constant estimates is calculated based on one of the plurality of values of the normalized variable, and represents the response of the plant to the control input at one of the different times during the response period. The time constant estimator is further configured to determine a maximum time constant for the response of the plant over the response period based on the plurality of time constant estimates. The extremum-seeking controller further includes a control input generator configured to use the maximum time constant value to generate the control input for the plant. The plant uses the control input to affect a variable state or condition of the plant.

DETAILED DESCRIPTION

Overview

Figure 1:
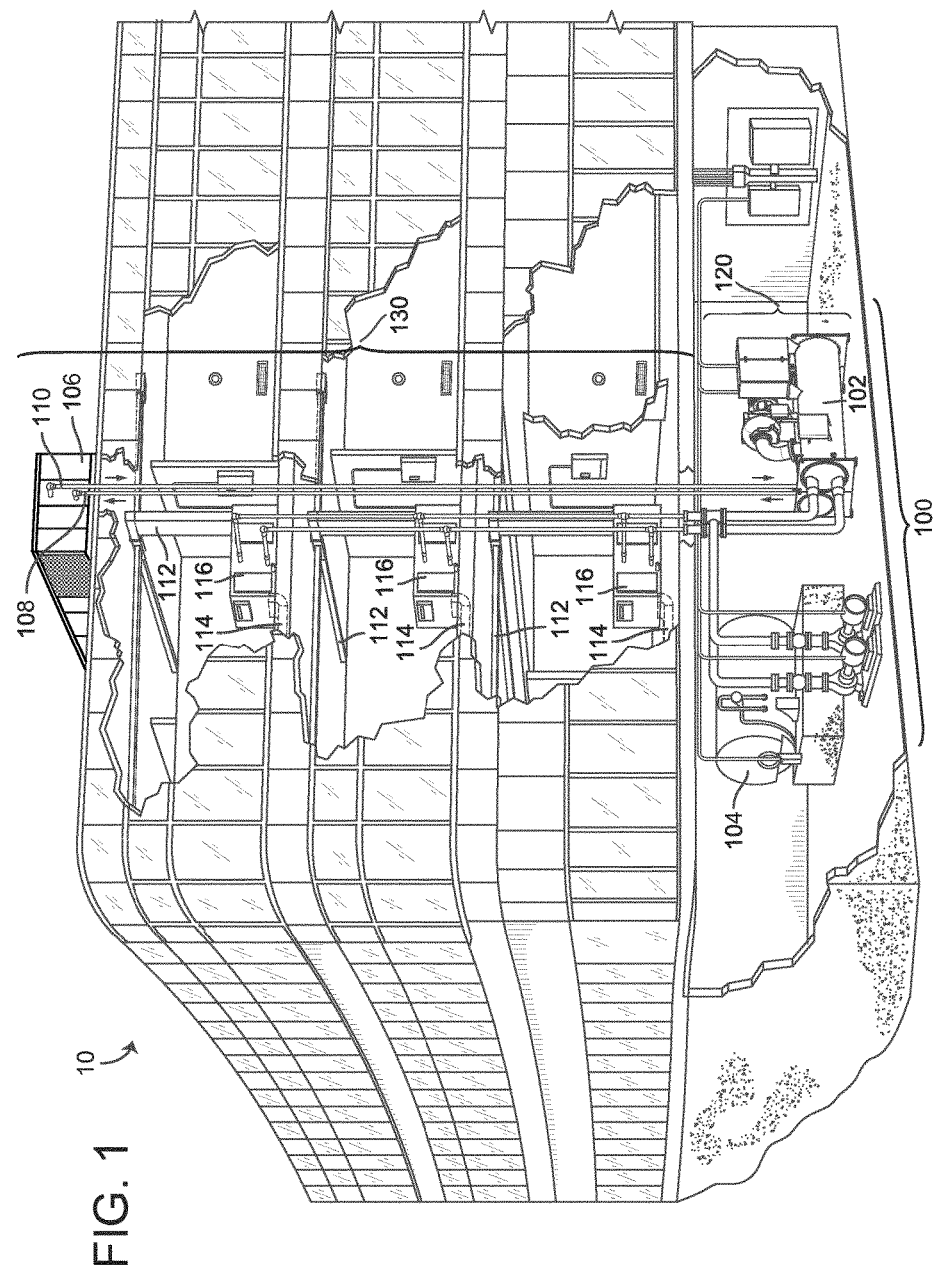
FIG. 1 is a drawing of a building equipped with an HVAC system, according to some embodiments.

Referring generally to the FIGURES, systems and methods for estimating a maximum time constant for a control system are shown, according to various exemplary embodiments. The maximum time constant can be used by the control system for controlling a plant. The plant may be, for example, part of a heating, venting, and air conditioning (HVAC) system, or other control system. The maximum time constant is generally representative of the slowest part of a response of the plant to a control input (e.g., an input signal or manipulated variable provided as an input to the plant) in a higher order or non-linear system. The control system can automatically adjust or adapt the control input provided to the plant or the method used to generate the control input based on the maximum time constant. Advantageously, this allows the control system to account for the ability of the plant to respond to the control input and enables the control system to provide the plant with more effective control inputs based on the maximum time constant.

The maximum time constant can be calculated by first gathering data from the plant using an open loop step test. The control system can provide the plant with a step change in the control input. The control system can monitor the output of the plant (e.g., a monitored variable) in response to the step change in the control input from the start of the plant response until the output has settled at a steady-state value. The control system can calculate a normalized variable from the output, wherein each part of the output is modeled as a first-order function. The control system can calculate a time constant for each part of the output, resulting in a plurality of time constants. The control system can then estimate the maximum time constant based on the plurality of time constants calculated for the entire response.

The time constant estimation may be used in several types of control algorithms. For example, the time constant estimation may be used for extremum-seeking control (ESC). ESC requires knowledge of the plant bandwidth (i.e., the time constant) in order to configure the plant for operation. Underestimation of the time constant can lead to instability in the ESC algorithm; the systems and methods described herein can help stabilize the ESC algorithm by determining a very conservative estimate, by using the maximum time constant estimate. As another example, the time constant estimation may be used for a proportional-integral (PI) adaptive controller. Such an adaptive controller may require a sampling interval to be set based on the response time of the open loop plant. An underestimated response time and corresponding sample period may likewise cause problems in the PI algorithm, and the use of the systems and methods herein may allow the algorithm to calculate a more robust sample period for the plant. As yet another example, the time constant estimation may be used in selection of a sample rate for wireless sensors. A longer estimation of a sample rate may result in a reduced sampling rate of the sensor, which would help preserve battery life of the sensor. Using the systems and methods herein, a longer sampling interval may be identified and used.

Building and HVAC System

Figure 2:
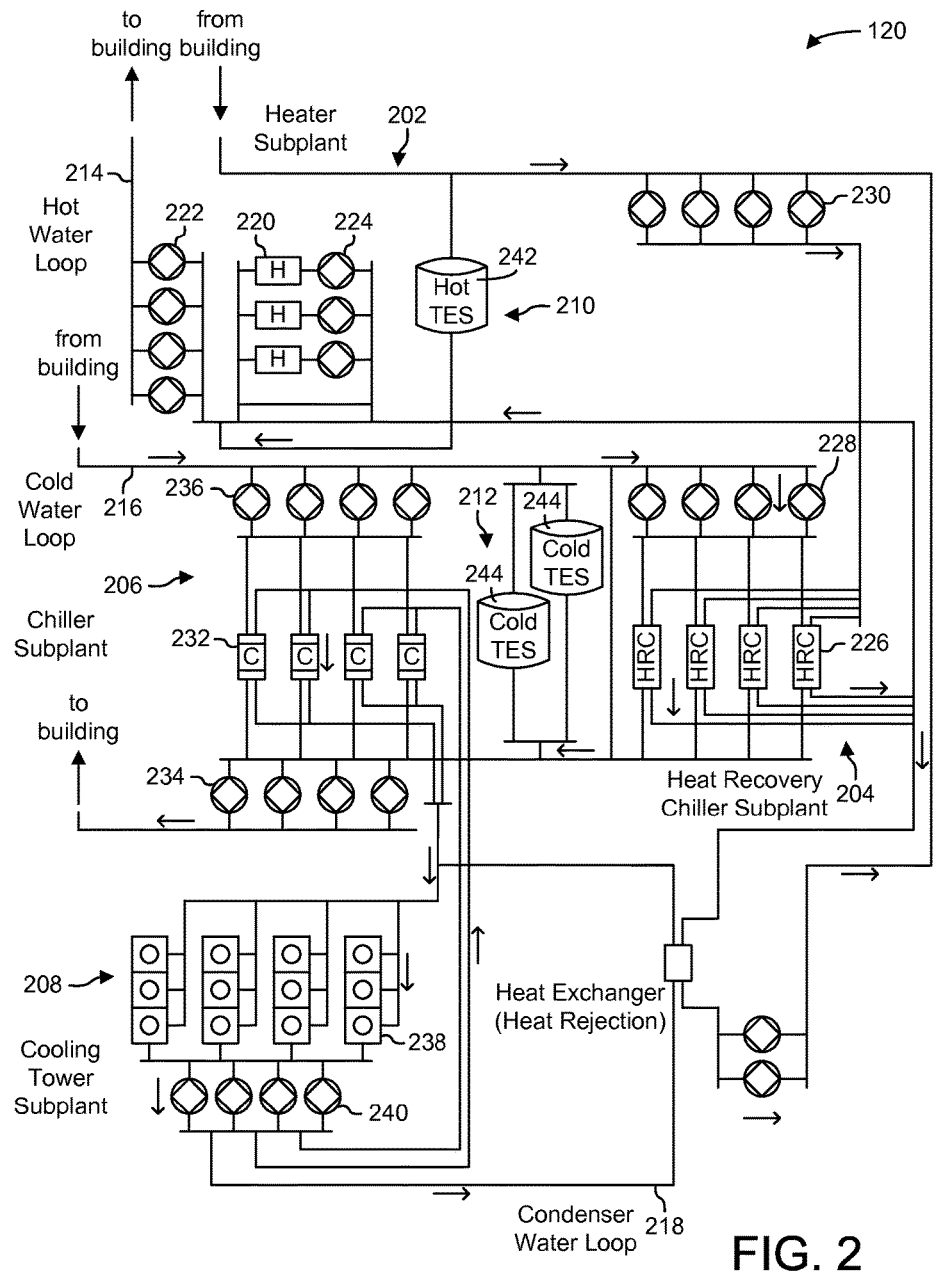
FIG. 2 is a schematic of a waterside system which can be used as part of the HVAC system of FIG. 1, according to some embodiments.
Figure 3:
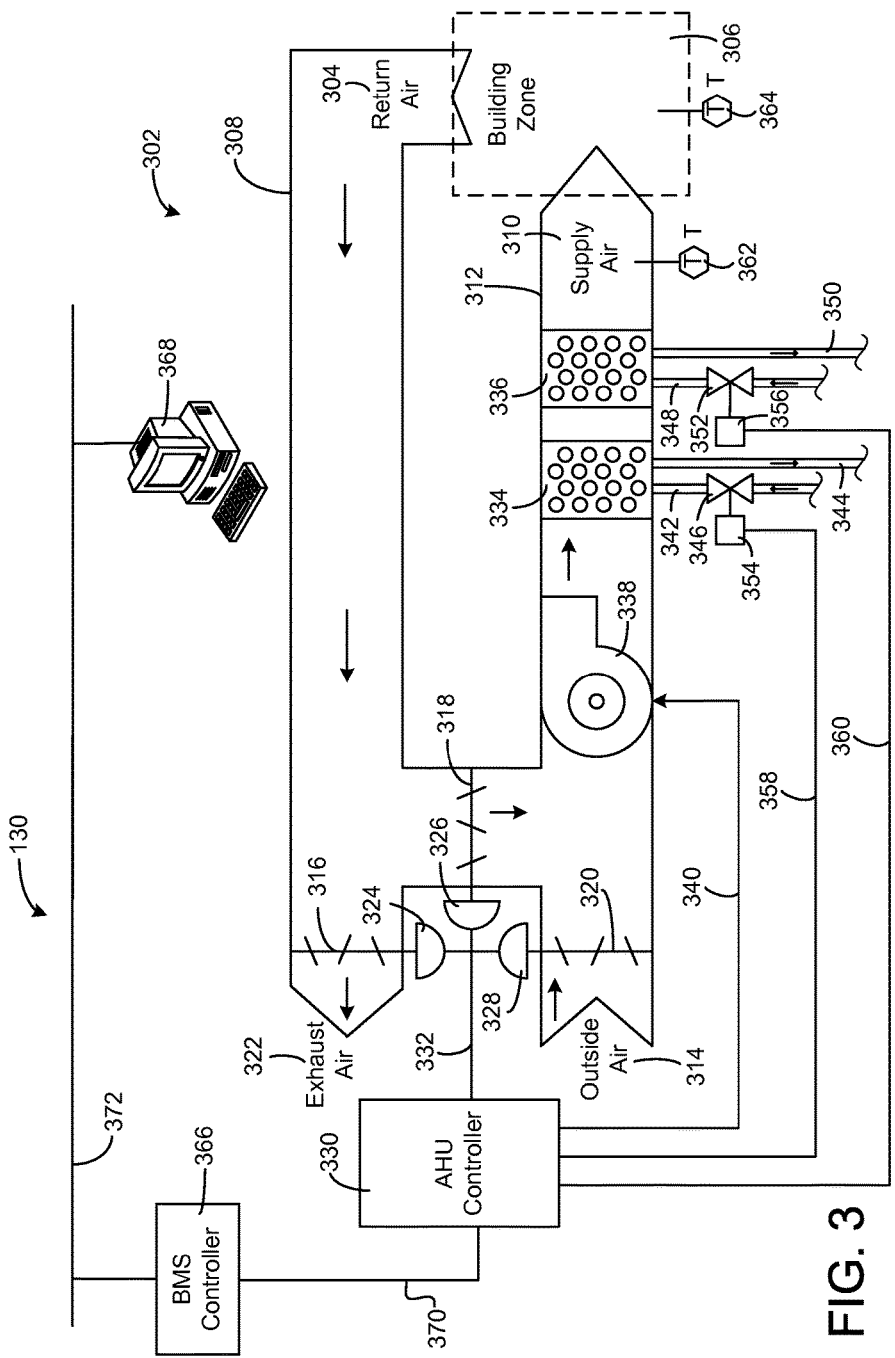
FIG. 3 is a block diagram illustrating an airside system which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system that optimizes or regulates a variable of interest. For example, the systems and methods herein may be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, such control strategies may be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that these control strategies can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.) as may be suitable for various applications. All such implementations should be considered within the scope of the present disclosure.

Referring particularly to FIG. 1, a perspective view of a building 10 is shown. Building 10 may generally include a building management system (e.g., a system of devices configured to control, monitor, and manage equipment in or around building 10). The building management system can include, for example, a HVAC system, a security system, a lighting system, a fire alerting system, any other system that is capable of managing building functions or devices, or any combination thereof.

Building 10 is served by an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of waterside system 120 is shown, according to an exemplary embodiment. Waterside system 120 can include a subset of the HVAC devices in HVAC system 100 (e.g., boiler 104, chiller 102, pumps, valves, etc.) and can operate to supply a heated or chilled fluid to AHU 106. The HVAC devices of waterside system 120 can be located within building 10 (e.g., as components of waterside system 120) or at an offsite location such as a central plant.

In FIG. 2, waterside system 120 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 120 are within the scope of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 120 (e.g., pumps 222, 224, 228, 230, 234, 236, and/or 240) or pipelines in waterside system 120 include an isolation valve associated therewith. Isolation valves can be integrated with the pumps or positioned upstream or downstream of the pumps to control the fluid flows in waterside system 120. In various embodiments, waterside system 120 can include more, fewer, or different types of devices and/or subplants based on the particular configuration of waterside system 120 and the types of loads served by waterside system 120.

Referring now to FIG. 3, a block diagram of an airside system 130 is shown, according to an exemplary embodiment. Airside system 130 can include a subset of the HVAC devices in HVAC system 100 (e.g., AHU 106, VAV units 116, ducts 112-114, fans, dampers, etc.) and can be located in or around building 10. Airside system 130 can operate to heat or cool an airflow provided to building 10 using a heated or chilled fluid provided by waterside system 120.

In FIG. 3, airside system 130 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum-seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 120 (e.g., from cold water loop 216) via piping 342 and can return the chilled fluid to waterside system 120 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 120 (e.g., from hot water loop 214) via piping 348 and can return the heated fluid to waterside system 120 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 130 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 130, waterside system 120, HVAC system 100, and/or other controllable systems that serve building 10. BMS controller 366 can communicate with multiple downstream building systems or subsystems (e.g., HVAC system 100, a security system, a lighting system, waterside system 120, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU Extremum-Seeking Control System Referring now to FIG. 4, a block diagram of an extremum-seeking control (ESC) system 400 is shown, according to some embodiments. ESC system 400 is provided as an example control system that may implement the systems and methods herein. However, it should be understood that the example is not limiting. As described above, the maximum time constant estimate generated by the systems and methods herein may be implemented by any type of control system. For example, the maximum time constant estimate may be implementable in a control system that uses a PI adaptive controller rather than an extremum-seeking controller.

ESC system 400 is shown to include an extremum-seeking controller 402 and a plant 404. A plant in control theory is the combination of a process and one or more mechanically-controlled outputs. For example, plant 404 can be an AHU configured to control temperature within a building space via one or more mechanically-controlled actuators and/or dampers. In various embodiments, plant 404 can include a chiller operation process, a damper adjustment process, a mechanical cooling process, a ventilation process, a refrigeration process, or any other process in which an input variable to plant 404 (i.e., manipulated variable u) is adjusted to affect an output from plant 404 (i.e., performance variable y).

Extremum-seeking controller 402 uses extremum-seeking control logic to modulate the manipulated variable u. For example, extremum-seeking controller 402 may use a signal to modulate the DC value of manipulated variable u in order to extract a performance gradient p. The performance gradient p represents the gradient or slope of the performance variable y with respect to the manipulated variable u. Extremum-seeking controller 402 uses extremum-seeking control logic to determine a value for the manipulated variable u that drives the performance gradient p to zero.

Extremum-seeking controller 402 may determine the DC value of manipulated variable u based on a measurement or other indication of the performance variable y received as feedback from plant 404 via input interface 410. Measurements from plant 404 can include, but are not limited to, information received from sensors about the state of plant 404 or control signals sent to other devices in the system. In some embodiments, the performance variable y is a measured or observed position of a valve. In other embodiments, the performance variable y is a measured or calculated amount of power consumption, a fan speed, a damper position, a temperature, or any other variable that can be measured or calculated by plant 404. Performance variable y can be the variable that extremum-seeking controller 402 seeks to optimize via an extremum-seeking control technique. Performance variable y can be output by plant 404 or observed at plant 404 (e.g., via a sensor) and provided to extremum-seeking controller at input interface 410.

Input interface 410 provides the performance variable y to a performance gradient probe 412 to detect a performance gradient 414. Performance gradient 414 may indicate a slope of the function $y=f(u)$, where y represents the performance variable received from plant 404 and u represents the manipulated variable provided to plant 404. When performance gradient 414 is zero, the performance variable y has an extremum value (e.g., a maximum or minimum). Therefore, extremum-seeking controller 402 can optimize the value of the performance variable y by driving performance gradient 414 to zero.

A manipulated variable updater 416 produces an updated manipulated variable u based upon performance gradient 414. In some embodiments, manipulated variable updater 416 includes an integrator to drive performance gradient 414 to zero. Manipulated variable updater 416 then provides an updated manipulated variable u to plant 404 via output interface 418. As one example, manipulated variable u is provided to a damper or an actuator affecting the damper as a control signal via output interface 418. Plant 404 can use manipulated variable u as a setpoint to adjust the position of the dampers and thereby control the relative proportions of outdoor air and recirculation air provided to a temperature-controlled space.

It should be understood that while input interface 410 and output interface 418 are shown as separate interfaces, in other embodiments controller 402 may include a single interface configured to facilitate communication with plant 404. The single interface may be configured to both receive feedback from plant 404 and to provide feedback to plant 404.

Control System

Figure 5:
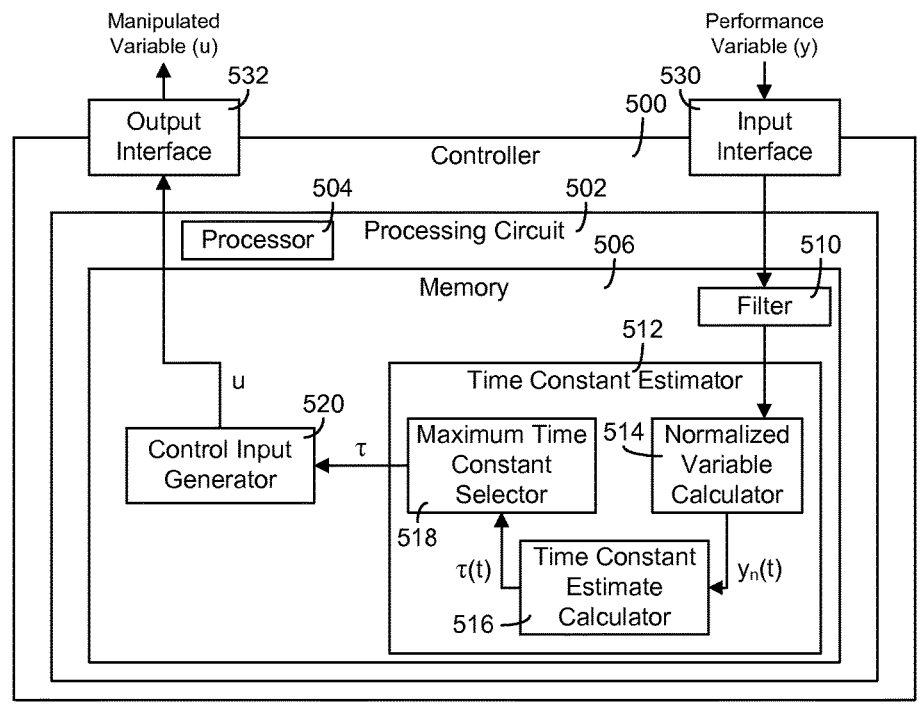
FIG. 5 is block diagram of a controller configured to monitor and control a plant, according to some embodiments.

Referring now to FIG. 5, a block diagram illustrating a controller 500 is shown, according to an exemplary embodiment. Controller 500 can be configured to monitor and control any of a variety of systems or processes. For example, controller 500 can be part of a feedback control system, a feedforward control system, a state-based control system, or any other type of control system. In some embodiments, controller 500 is an extremum-seeking controller (e.g., controller 402). In other embodiments, controller 500 can be a state-based controller, proportional-integral (PI) controller, proportional-integral-derivative (PID) controller, model predictive controller (MPC), a pattern recognition adaptive controller (PRAC), a model recognition adaptive controller (MRAC), or any other type of adaptive tuning or feedback controller. In some embodiments, controller 500 is part of a building control system (e.g., a HVAC system) configured to monitor and control building equipment (e.g., HVAC equipment).

Figure 4:
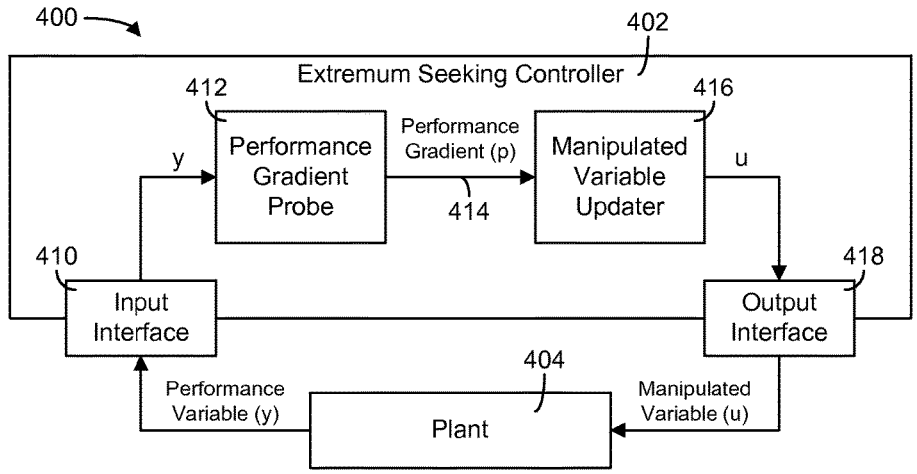
FIG. 4 is a block diagram of an example extremum-seeking control (ESC) system in which the systems and methods of the present disclosure may be implemented, according to some embodiments.

Controller 500 is shown to include an input interface 530 and output interface 532, which may be similar to the interfaces described in FIG. 4. For example, controller 500 can provide a control input (e.g., manipulated variable u) to plant 404 via output interface 532 and can receive a feedback (e.g., performance variable y) from plant 404 via input interface 530. Controller 500 can provide plant 404 with a predetermined control input u (e.g., a step test) in order to test the response of plant 404. Controller 500 can use the feedback y from plant 404 in response to the control input u to determine a maximum time constant of plant 404. In some embodiments, controller 500 uses the maximum time constant and/or response time of plant 404 to adjust the control input u provided to plant 404.

Controller 500 may generally include a processing circuit 502 including a processor 504 and memory 506 for carrying out the activities described herein. Processor 504 can be implemented as a general purpose processor, an application specific integrated circuit (ASIC), one or more field programmable gate arrays (FPGAs), a group of processing components, or other suitable electronic processing components. Memory 506 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 506 can be or include volatile memory or non-volatile memory. Memory 506 can include database components, object code components, script components, or any other type of information structure for supporting the various activities and information structures described in the present application. According to an exemplary embodiment, memory 506 is communicably connected to processor 504 via processing circuit 502 and includes computer code for executing (e.g., by processing circuit 502 and/or processor 504) one or more processes described herein. In some embodiments, controller 500 is implemented within a single computer (e.g., one server, one housing, etc.). In other embodiments controller 500 can be distributed across multiple servers or computers (e.g., that can exist in distributed locations).

To determine the maximum time constant, controller 500 may initiate an open loop step test by providing plant 404 with a step change in the control input u. Controller 500 may monitor the plant response y in response to the step change in the control input u. In some embodiments, controller 500 analyzes the plant response y by calculating the log of the plant response y as a function of time.

Controller 500 is shown to include a digital filter 510. Filter 510 may receive the performance variable y as a feedback signal from plant 404 and may apply a filter or smoothing function to the feedback signal y. During an open loop step test, the feedback signal y from plant 404 may be impacted by noise. Therefore, a smoothing function or other similar function may be applied to the feedback signal y so that the calculation of the slope (described below) is more precise. In some embodiments, a Savitzky-Golay filtering method may be applied to the feedback signal y.

Controller 500 generally includes a time constant estimator 512 and a control input generator 520 for estimating a maximum time constant and using the maximum time constant to generate a control input for plant 404. In some embodiments, time constant estimator 512 and control input generator 520 are part of performance gradient probe 412 as shown in FIG. 4. Time constant estimator 512 is shown to include a normalized variable calculator 514, a time constant calculator 516, and a maximum time constant selector 518. Each of these components is described in detail below.

Normalized variable calculator 514 can be configured to calculate a normalized variable $y_n(t)$ for each value $y(t)$ of the feedback signal y from plant 404. In a first-order system, the following expression generally represents the analytical response of a first-order system output variable y to a step change in its input:

$$y(t) = y(0) + (y_f - y(0))\left(1 - \exp\left(\frac{-t}{\tau}\right)\right) \quad (1)$$

where $y(0)$ is the initial value of the plant output before the step change, $y_f$ is the final steady-state value of the plant after the response has settled, t is time, and $\tau$ is the time constant.

Based on equation (1), normalized variable calculator 514 can calculate a normalized variable $y_n(t)$ for each of a plurality of values $y(t)$ of the feedback signal y from plant 404. Each value of the normalized variable $y_n(t)$ can be calculated by subtracting the initial value $y(0)$ from the value of the plant output variable $y(t)$ at the corresponding time t, dividing by the total range of the plant feedback signal y (i.e., $y_f - y(0)$), and subtracting this result from one, as shown in the following equation:

$$y_n(t) = 1 - \frac{y(t) - y(0)}{y_f - y(0)} \quad (2)$$

Normalized variable calculator 514 can repeat this calculation for each of a plurality of values of the feedback signal y (e.g., y(1), y(2), y(3), etc.) which results in a plurality of values for the normalized variable $y_n(t)$ (e.g., $y_n(1)$, $y_n(2)$, $y_n(3)$, etc.).

Time constant calculator 516 can be configured to calculate a time constant $\tau(t)$ for each of the plurality of values of the normalized variable $y_n(t)$. The time constant $\tau(t)$ can be expressed in terms of the normalized variable $y_n(t)$ as follows:

$$\tau(t) = \frac{-t}{\ln(y_n(t))} \quad (3)$$

From expression (3), it can be deduced for the considered first-order system that the time constant τ(t) is related to the slope of the log of the normalized variable $y_n(t)$, as shown in the following equation:

$$\tau(t) = -\left[\frac{d(\ln(y_n(t)))}{dt}\right]^{-1} \quad (4)$$

Figure 6A:
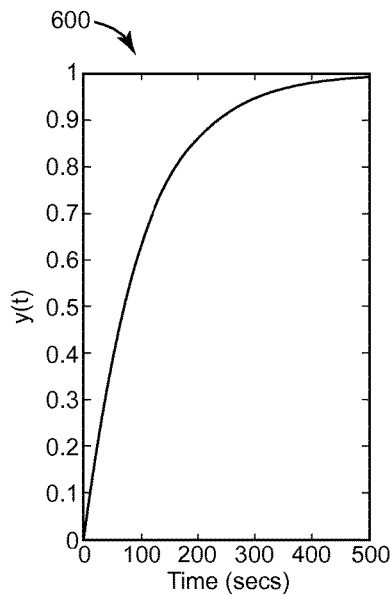
FIG. 6A is a graph illustrating an example response $y_n$ of a first-order system to a step change, according to some embodiments.
Figure 6B:
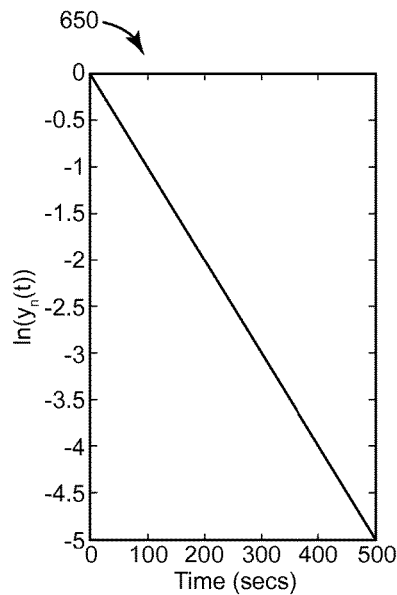
FIG. 6B is a graph illustrating the log of the normalized variable $y_n$ of FIG. 6A plotted against time, according to some embodiments.
Figure 7A:
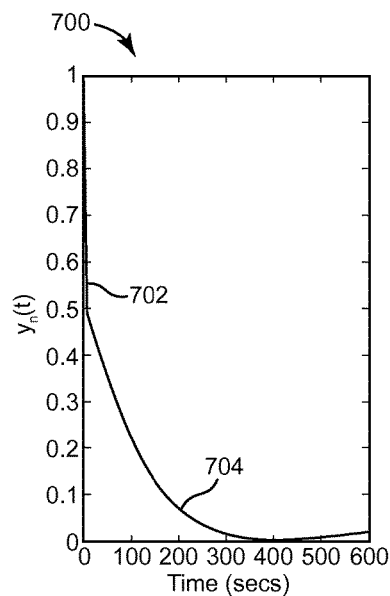
FIG. 7A is a graph illustrating an example response $y_n$ of a higher order system to a step change, according to some embodiments.
Figure 7B:
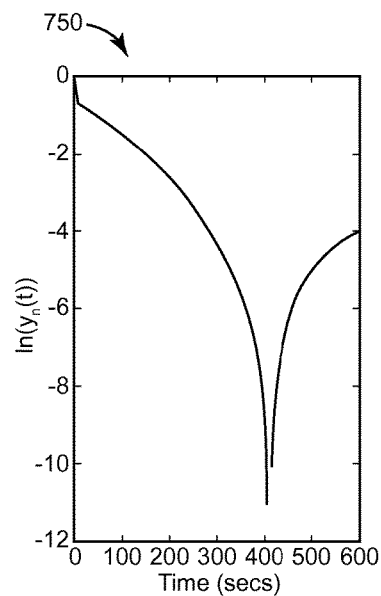
FIG. 7B is a graph illustrating the log of the normalized variable $y_n$ of FIG. 7A plotted against time, according to some embodiments.

Time constant calculator 516 can repeat this calculation for each of the plurality of values of the normalized variable $y_n(t)$ (e.g., $y_n(1)$, $y_n(2)$, $y_n(3)$, etc.) which results in a plurality of values for the time constant τ(t) (e.g., τ(1), τ(2), τ(3), etc.). Each time constant τ(t) may represent the time constant of plant 404 at a particular instant during the response period. The slope of $\ln(y_n(t))$ may be constant for a first-order system, as shown in FIGS. 6A-B, which may result in each value of the time constant τ(t) being the same for a first-order system. However, the slope of $\ln(y_n(t))$ may vary for higher order systems, as shown in FIGS. 7A-7B, which may result in a plurality of different values for the time constant τ(t) for a higher order systems.

Maximum time constant selector 518 can be configured to determine a maximum time constant τ for plant 404. In some embodiments, maximum time constant selector 518 determines the maximum time constant τ by selecting the maximum time constant from the set of time constants τ(t) generated by time constant calculator 516. The maximum time constant τ may represent the maximum time constant of plant 404 across the entire response period.

Control input generator 520 can be configured to generate the control input u(t) for plant 404 based on the maximum time constant τ. In some embodiments, control input generator 520 uses the maximum time constant τ as a parameter in an extremum-seeking control algorithm (ESC). ESC requires knowledge of the plant bandwidth (i.e., the time constant) in order to configure the plant for operation. Underestimation of the time constant can lead to instability in the ESC algorithm; the systems and methods described herein can help stabilize the ESC algorithm by determining a very conservative estimate, by using the maximum time constant estimate. Various implementations of ESC are described in detail in U.S. Pat. Nos. 8,473,080, 7,827,813, 8,027,742, 8,200,345, 8,200,344, U.S. patent application Ser. Nos. 14/495,773, 14/538,700, 14/975,527, 14/961,747, 15/080,435, and 15/284,468. Each of these patents and patent applications is incorporated by reference herein.

As another example, control input generator 520 can use the maximum time constant τ to adjust the values of one or more parameters used by control input generator 520. For example, the maximum time constant τ can be used as an input to a proportional-integral (PI) control algorithm (e.g. for embodiments in which control input generator 520 is configured as an adaptive PI controller). Such an adaptive controller may require a sampling interval to be set based on the response time of the open loop plant. An underestimated response time and corresponding sample period may likewise cause problems in the PI algorithm, and the use of the systems and methods herein may allow the algorithm to calculate a more robust sample period for the plant. In some embodiments, control input generator 520 uses the maximum time constant τ to calculate controller parameters such as an integral time $T_i$ or a proportional gain. Several examples of how control input generator 520 can calculate controller operating parameters based on the estimated response time τ are described in detail in U.S. Pat. Nos. 5,355,305, 5,506,768, 6,937,909, and U.S. patent application Ser. No. 15/173,295. The entire disclosure of each of these patents and patent applications is incorporated by reference herein.

As yet another example, control input generator 520 can use the maximum time constant τ to select a sampling rate for wireless sensors. A longer time constant may result in a reduced sampling rate of the sensor, which would help preserve battery life of the sensor. Using the systems and methods herein, a longer sampling interval may be identified and used. For example, controller 500 can use the maximum time constant τ to adjust the rate at which samples of the performance variable y are collected from plant 404. Several examples of how control input generator 520 can calculate a sampling rate based on the estimated response time τ are described in detail in U.S. Pat. No. 9,395,708, U.S. patent application Ser. Nos. 15/173,284, and 15/173,295. The entire disclosure of each of these patents and patent applications is incorporated by reference herein.

Example Graphs

Referring now to FIGS. 6A-9, several graphs 600-900 illustrating example data for a calculation of a time constant are shown. Graph 600 of FIG. 6A illustrates an example response $y_n$ of a first-order system to a step change in the control input, and graph 650 FIG. 6B shows the log of the normalized variable $y_n$ plotted against time. In the example of FIG. 6B, the slope of the line is constant (and is shown as −5/500=−0.01). The time constant τ(t), as defined by equation (4), is the negative value of the reciprocal of this slope, which is equal to 100 seconds in the example of FIGS. 6A-B.

Since the slope of $\ln(y_n(t))$ is constant for first-order systems, each value of the time constant τ(t) may have the same value, which results in the maximum time constant τ also having the value of 100 seconds in this example. In some embodiments, a single time constant τ is calculated for first-order systems (e.g., based on a single value of the normalized variable $y_n$) rather than calculating multiple values of the time constant τ (t) and selecting the maximum value because each value of the time constant τ(t) may be the same for first-order systems.

For higher order or non-linear systems, the slope of the log of the normalized variable $y_n$ $$\left(i.e., \frac{d(\ln(y_n(t)))}{dt}\right)$$

can still be calculated, but the slope of ln $y_n(t)$ may not be constant over the duration of the response period. In order to determine the maximum time constant τ, the slope of the log of the normalized variable $y_n$ can be analyzed at each point in the response. In other words, instead of calculating a single time constant τ, a time constant function τ(t) can be calculated, and the maximum value of that time constant function can be selected as the maximum time constant.

In order to calculate the maximum time constant for higher order or non-linear systems, normalized variable calculator 514 can calculate a normalized variable $y_n(t)$ for each of a plurality of values of the plant response y(t), via expression (2) above. Referring to FIG. 7A, a graph 700 illustrating example data of a normalized variable $y_n(t)$ plotted against time is shown. In the example of FIG. 7A, the system is of a higher order or non-linear, as opposed to the first-order system shown in FIG. 6A. FIG. 7B is a graph 750 illustrating the log of $y_n(t)$ (i.e., ln $y_n(t)$) over time. As compared to the first-order system of FIGS. 6A-6B, the response $y_n(t)$ is very different and the slope of the response varies significantly over time. In graph 700, the response $y_n(t)$ is shown to have a very fast initial reaction 702 to the step change, followed by a slower response 704.

Further, in the higher order system, plant 404 is shown to overshoot its target in FIG. 7A. The variable $y_n(t)$ is shown to overshoot its target value, and changes direction at approximately 400 seconds. This behavior is reflected in FIG. 7B as $\ln(y_n(t))$ becomes indeterminate at a value of $y_n(t)=0$. Normalized variable $y_n(t)$ can be calculated from the following equation, a modification of (2) above:

$$y_n(t) = \frac{y(t) - \min(y)}{\max(y) - \min(y)} \quad (5)$$

Time constant calculator 516 can generate a time constant function $\tau(t)$ from the values of $y_n(t)$ calculated at equation (5). The time constant function is based on equation (4) shown above. An example of the time constant function is shown in equation (6):

$$\tau(t) = \left| \frac{d(\ln(y_n(t)))}{dt} \right|^{-1} \quad (6)$$

In equation (6), the natural log of $y_n(t)$ (i.e., $\ln(y_n(t))$) is calculated and the slope of $\ln(y_n(t))$ is determined. The absolute value of the slope is determined to remove negative values. The reciprocal of the absolute value of the slope is used as the time constant $\tau(t)$.

Figure 8:
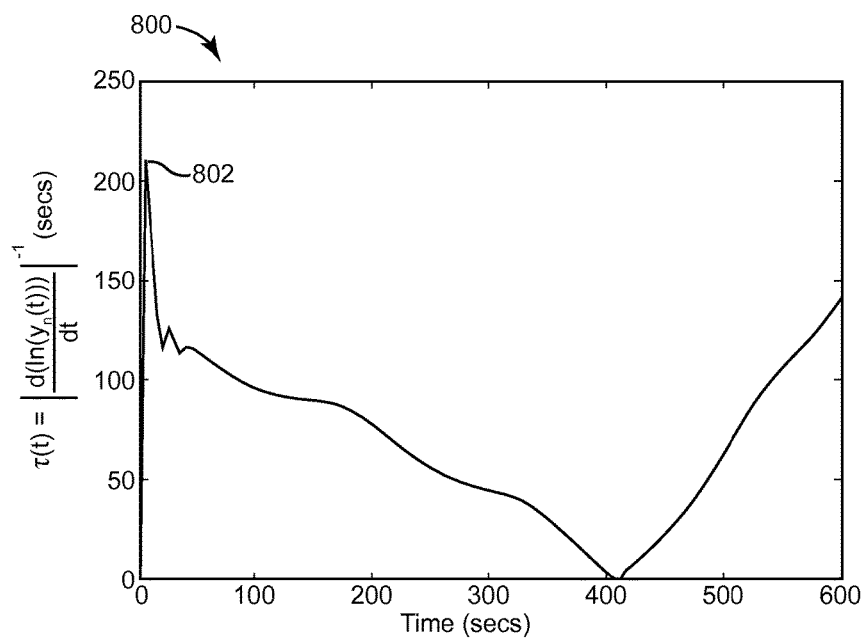
FIG. 8 is a graph illustrating values of a time constant $\tau(t)$ calculated from the normalized variable $y_n$ of FIG. 7A, according to some embodiments.

Referring also to FIG. 8, a graph 800 of the values of $\tau(t)$ $$\left( \text{i.e.,} \left| \frac{d(\ln(y_n(t)))}{dt} \right|^{-1} \right)$$

for the higher-order example illustrated in FIGS. 7A-7B is shown. The maximum value 802 of $\tau(t)$ can be determined by maximum time constant selector 518 and selected as the maximum time constant. In the example of FIG. 8, the maximum value 802 is shown to be approximately 211 seconds and occurs within the first 30 seconds of the response period.

Figure 9:
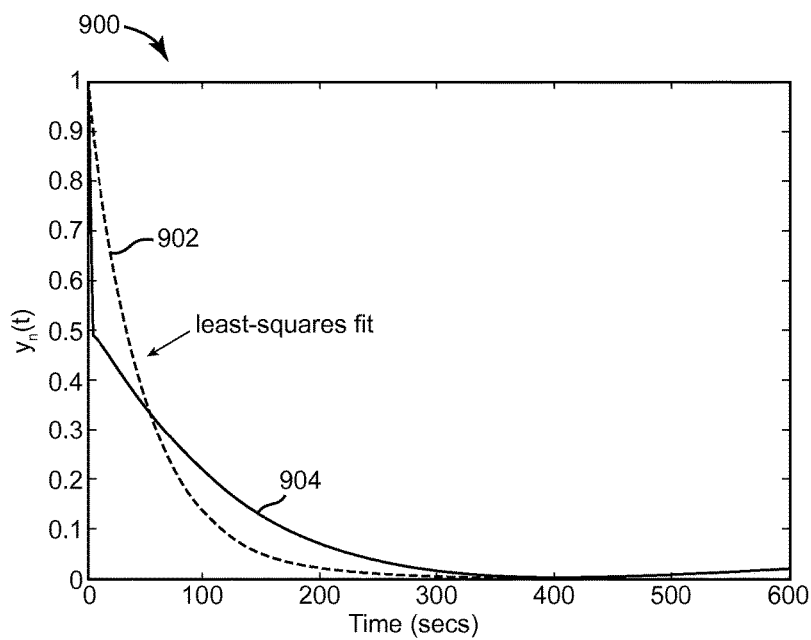
FIG. 9 is a graph illustrating time constant estimation methods which can be performed by the controller of FIG. 5 for a first-order system and a higher order system, according to some embodiments.

Referring to FIG. 9, a graph 900 comparing an ideal first-order response to the higher order response is shown. Graph 900 shows a least-squares fit 902 of an ideal first-order response to step test data along with the higher order response 904 (i.e., the response shown in FIG. 7A). The least-squares fit 902 of the ideal first-order response is a conventional method of estimating the time constant which results in a time constant of approximately 50 seconds. Another method commonly used in practice is to estimate the time it takes for the response to decay 63%. Based on this approach, the value of the time constant is approximately 50 seconds as well. As discussed above, the maximum time constant $\tau$ based on the higher order system illustrated in FIGS. 7A-8 results in a time constant of approximately 211 seconds. Hence, based on the example provided, the systems and methods herein allow for a more conservative estimate of the slowest part of the response, which cannot be captured using the other approaches.

Maximum Time Constant Estimation Process

Figure 10:
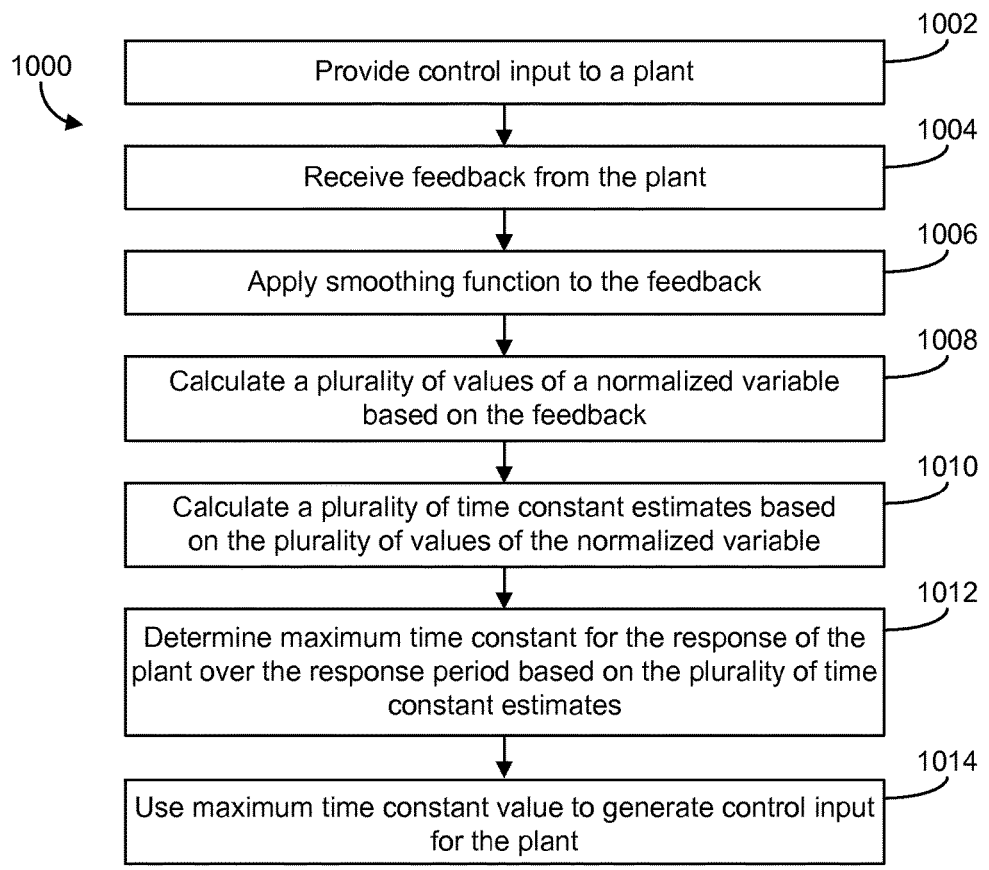
FIG. 10 is a flow chart of a process for determining a maximum time constant for a control system, according to some embodiments.

Referring now to FIG. 10, a flow chart of a process 1000 of calculating a maximum time constant parameter for a control system is shown, according to an exemplary embodiment. Process 1000 can be executed by, for example, ESC system 400 and more particularly extremum-seeking controller 402 as described above.

Process 1000 includes providing a control input u(t) to a plant (block 1002) and receiving, at a controller, feedback y(t) from the plant (block 1004). The control input u(t) may be, for example, an open loop step test configured to cause non-linear feedback from the plant. The feedback y(t) is representative of a response of the plant to the control input over a response period.

Process 1000 may include applying a smoothing function to the feedback y(t) (block 1006). The smoothing function removes noise from the feedback that may potentially cause inaccuracies in calculating the time constant estimate. The noise is removed before the time constant is estimated.

Process 1000 includes calculating a plurality of values $y_n(t)$ of a normalized variable based on the feedback (block 1008). The normalized variable may be calculated as shown in equation (5) above. Each value of the normalized variable may be representative of the response of the plant at a different time during the response period. In some embodiments, a plurality of values of the normalized variable $y_n(t)$ are calculated, one value for each sample of the feedback y(t). Process 1000 includes calculating a plurality of time constant estimates $\tau(t)$ for each value of the normalized variable $y_n(t)$ representative of the response of the plant to the control input (block 1010). At block 1010, for each point in the normalized variable $y_n(t)$, a time constant estimate $\tau(t)$ may be calculated. The time constant estimate $\tau(t)$ may be representative of the response of the plant to the control input at one of the different times during the response period. In some embodiments, a plurality of values of the time constant estimate $\tau(t)$ are calculated, one value for each value of the normalized variable $y_n(t)$.

Process 1000 includes determining, at the controller, a maximum time constant value $\tau$ for the response of the plant over the response period based on the plurality of time constant estimates (block 1012). At block 1012, the maximum of the time constant estimates $\tau(t)$ can be selected as the maximum time constant value $\tau$. Process 1000 then includes using the maximum time constant value $\tau$ to generate the control input u(t) for the plant (block 1014). For example, the maximum time constant value $\tau$ can be used as a parameter in a control algorithm that generates the control input u(t) for the plant as a function of the feedback y(t) from the plant.

The control input u(t) can be provided as an input to the plant and used by the plant to affect a variable state or condition within the system or process represented by the plant. For example, if the plant is a HVAC system or process, the control input u(t) can be used to control HVAC equipment that operate to affect a variable state or condition within a building (e.g., temperature, humidity, power consumption, enthalpy, etc.). In some embodiments, the variable state or condition affected by the control input u(t) is the performance variable or feedback y(t) from the plant.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a plant, the controller comprising:
   a communications interface configured to provide a control input to the plant and to receive feedback from the plant, the feedback representative of a response of the plant to the control input over a response period;
   a time constant estimator configured to:
      calculate a plurality of values of a normalized variable by normalizing a plurality of values of the feedback from the plant relative to a range of the feedback from the plant, each value of the normalized variable representative of the response of the plant at a different time during the response period;
      calculate a plurality of time constant estimates, wherein each of the time constant estimates is calculated based on one of the plurality of values of the normalized variable and represents the response of the plant to the control input at one of the different times during the response period; and
      select a maximum time constant for the response of the plant over the response period from the plurality of time constant estimates; and
   a control input generator configured to use the maximum time constant to generate the control input for the plant, wherein the plant uses the control input to affect a variable state or condition of the plant.

2. The controller of claim 1, wherein the time constant estimator is configured to determine that the response of the plant to the control input is non-linear in response to the plurality of time constant estimates having a plurality of different values.

3. The controller of claim 1, wherein:
   the control input generator is configured to perform a step test of the plant by providing the plant with a step change in the control input; and
   the feedback from the plant is representative of a response of the plant to the step test.

4. The controller of claim 1, further comprising a filter configured to apply a smoothing function to the feedback to remove noise from the feedback before the feedback is provided to the time constant estimator.

5. The controller of claim 1, wherein:
   the plant comprises a building HVAC system configured to use the control input to operate HVAC equipment; and
   the feedback from the plant represents the variable state or condition of the HVAC system affected by operating the HVAC equipment.

6. The controller of claim 1, wherein the controller is an extremum-seeking controller configured to implement an extremum-seeking control algorithm to generate the control input.

7. The controller of claim 1, wherein:
   the controller is a proportional-integral (PI) controller configured to implement a PI feedback control algorithm to generate the control input; and
   the control input generator is configured to use the maximum time constant to generate a parameter used by the PI feedback control algorithm.

8. The controller of claim 1, wherein the controller is configured to use the maximum time constant to set a sampling rate for a wireless sensor of the plant from which the feedback is received.

9. A method for calculating and using a time constant to control a plant, the method comprising:
   providing, at a controller, a control input to a plant;
   receiving, at the controller, feedback from the plant, the feedback representative of a response of the plant to the control input over a response period;
   calculating, at the controller, a plurality of values of a normalized variable by normalizing a plurality of values of the feedback from the plant relative to a range of the feedback from the plant, each value of the normalized variable representative of the response of the plant at a different time during the response period;
   calculating, at the controller, a plurality of time constant estimates, wherein each of the time constant estimates is calculated based on one of the plurality of values of the normalized variable, and represents the response of the plant to the control input at one of the different times during the response period;
   selecting, at the controller, a maximum time constant for the response of the plant over the response period from the plurality of time constant estimates; and using the maximum time constant to generate the control input for the plant, wherein the plant uses the control input to affect a variable state or condition of the plant.

10. The method of claim 9, wherein the controller is configured to determine that the response of the plant to the control input is non-linear in response to the plurality of time constant estimates having a plurality of different values.

11. The method of claim 9, wherein a control input generator is configured to perform a step test of the plant by providing the plant with a step change in the control input; and the feedback from the plant is representative of a response of the plant to the step test.

12. The method of claim 9, further comprising applying a smoothing function to the feedback to remove noise from the feedback before the feedback is provided to a time constant estimator.

13. The method of claim 9, wherein the plant comprises a building HVAC system configured to use the control input to operate HVAC equipment; and the feedback from the plant represents the variable state or condition of the HVAC system affected by operating the HVAC equipment.

14. The method of claim 9, wherein the controller is an extremum-seeking controller configured to implement an extremum-seeking control algorithm to generate the control input.

15. The method of claim 9, wherein:

the controller is a proportional-integral (PI) controller configured to implement a PI feedback control algorithm to generate the control input; and a control input generator is configured to use the maximum time constant to generate a parameter used by the PI feedback control algorithm.

16. The method of claim 9, wherein the controller is configured to use the maximum time constant to set a sampling rate for a wireless sensor of the plant from which the feedback is received.

17. An extremum-seeking controller for a plant, the controller comprising:

a communications interface configured to:
 provide a control input to a plant; and
 receive feedback from the plant, the feedback representative of a response of the plant to the control input over a response period;

a time constant estimator configured to:
 calculate a plurality of values of a normalized variable by normalizing a plurality of values of the feedback from the plant relative to a range of the feedback from the plant, each value of the normalized variable representative of the response of the plant at a different time during the response period;
 calculate a plurality of time constant estimates, wherein each of the time constant estimates is calculated based on one of the plurality of values of the normalized variable, and represents the response of the plant to the control input at one of the different times during the response period; and
 select a maximum time constant for the response of the plant over the response period from the plurality of time constant estimates; and a control input generator configured to use the maximum time constant to generate the control input for the plant, wherein the plant uses the control input to affect a variable state or condition of the plant.

18. The extremum-seeking controller of claim 17, wherein the time constant estimator is configured to determine that the response of the plant to the control input is non-linear in response to the plurality of time constant estimates having a plurality of different values.

19. The extremum-seeking controller of claim 17, wherein the control input generator is configured to perform a step test of the plant by providing the plant with a step change in the control input; and the feedback from the plant is representative of a response of the plant to the step test.

20. The extremum-seeking controller of claim 17, further comprising a filter configured to apply a smoothing function to the feedback to remove noise from the feedback before the feedback is provided to the time constant estimator.

* * * * *